J. BRADY.
STEAM AND GAS ENGINE.

No. 175,655. Patented April 4, 1876.

Witnesses
John Becker
Jos. C. Wildman

James Brady
by his Attorneys
Brown & Allen

UNITED STATES PATENT OFFICE.

JAMES BRADY, OF BROOKLYN, NEW YORK.

IMPROVEMENT IN STEAM AND GAS ENGINES.

Specification forming part of Letters Patent No. 175,655, dated April 4, 1876; application filed March 1, 1876.

*To all whom it may concern:*

Be it known that I, JAMES BRADY, of the city of Brooklyn, in the county of Kings and State of New York, have invented a new and useful Improvement in Steam and Gas Engines; and I do hereby declare that the following is a full, clear, and exact description of the same, reference being had to the accompanying drawing, which forms part of this specification.

This invention, although applicable to various kinds of engines, including those driven by steam, is more particularly intended for gas-engines, in which compounds derived from the mixture of hydrocarbons with atmospheric air are ignited to produce a motive power or agent.

The invention consists in a combination of a trap with the exhaust-passage of an engine, and connecting ways or passages between the trap and opposite ends of the engine, whereby fluid or residuum of any kind collecting in the cylinder is readily run off through the exhaust and collected in the trap. The invention also consists in the combination of a trap with the valve-chest of the engine or combustion-chamber thereof, when the engine is a gas one, for the purpose of relieving said chest or chamber of fluid or residuum forming or collecting there.

To more clearly explain the uses of my invention, it will here be described as applied to a gas-engine of the description hereinbefore referred to. In such engines, especially when starting them, or when the temperature of the air does not readily vaporize the hydrocarbon liquid, there is a liability of liquid to accumulate in the engine, which interferes with the proper working of the latter, and at all times there is a tendency to an interfering accumulation of residuum both in the cylinder and combustion-chamber of the engine.

My invention provides for the perfect draining of all residuum or liquid from both the working-cylinder and combustion-chamber or valve-chest of the engine, and collection of the same in the traps.

Figure 1:
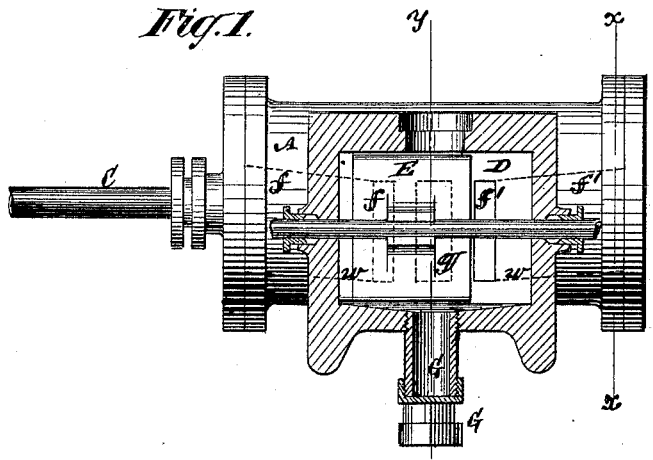
Figure 2:
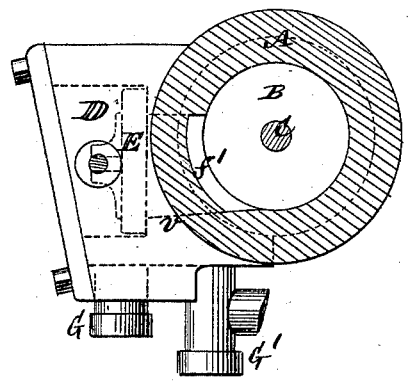
Figure 3:
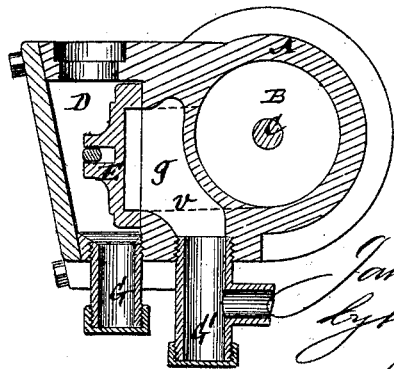

In the accompanying drawing, Figure 1 represents a partly sectional longitudinal view of a horizontal-cylinder gas-engine having my invention applied; Fig. 2, a vertical transverse section on the line $x\ x$, and Fig. 3 a similar section on the line $y\ y$.

A is the cylinder of the engine, B its reciprocating piston, and C the rod of the latter. D is the combustion-chamber, in which the gases resulting from the combustion of a mixture of atmospheric air under pressure and a hydrocarbon are generated, and used to reciprocate the engine-piston by means of a D slide-valve, E, arranged to control induction and eduction ports $f\ f'$ to or from opposite ends of the working-cylinder, and an intermediate exhaust passage, $g$, as in steam and other engines. This is in accordance with another invention of mine, which is made the subject of a separate application for Letters Patent, and the combustion-chamber D forms also the main valve-chest; but this invention is applicable likewise to other gas-engines, whether single or double acting, and in which there is no controlling main valve E. The chamber D, therefore, will here be referred to as the combustion-chamber of the engine.

G is a trap applied to the lower portion of the combustion-chamber D. This trap serves to collect any liquid or residuum that may be deposited in the combustion-chamber, and so that by opening the trap such collecting matter may be removed from time to time. G' is another trap applied at any suitable point to or in direct connection with the exhaust-passage $g$ of the engine. This trap serves to collect and to provide for the removal, as required, of any liquid or residuum that may be deposited or form in the engine-cylinder. To insure the draining of such matter from the engine-cylinder, the passages which control the ingress and egress of the impelling gas to either end of the engine-cylinder are made with a fall toward the exhaust, so that the collecting matter will run off by gravity from said cylinder into the exhaust, and from thence to the trap G'. Thus, the induction and eduction passages $f\ f'$ incline downward on their lower surfaces from the bottom of the cylinder toward the chamber D, as shown by the dotted lines $v\ v$, and again incline downward longitudinally toward their ends, which open into said chamber, as shown by the dotted lines $w\ w$. This provides for a ready clearance of the cylinder at all times of any residuum or liquid that may form or collect in the cylinder, and conveyance of the same to the trap G'.

I claim—

1. The combination, with the combustion-chamber D of the engine, of the trap G, substantially as and for the purposes herein set forth.

2. The combination of the trap G' with the exhaust-passage of the engine, and falling or inclined induction and eduction passages, connecting said trap with opposite ends of the engine-cylinder, essentially as and for the purposes herein described.

JAMES BRADY.

Witnesses:
MICHAEL RYAN,
FRED. HAYNES.